United States Patent
Yokoyama

(10) Patent No.: US 10,351,697 B2
(45) Date of Patent: Jul. 16, 2019

(54) TIRE RUBBER COMPOSITION MANUFACTURING METHOD AND TIRE RUBBER COMPOSITION

(71) Applicant: SUMITOMO RUBBER INDUSTRIES, LTD., Kobe-shi (JP)

(72) Inventor: Yuka Yokoyama, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 67 days.

(21) Appl. No.: 15/608,257

(22) Filed: May 30, 2017

(65) Prior Publication Data

US 2017/0355836 A1  Dec. 14, 2017

(30) Foreign Application Priority Data

Jun. 14, 2016 (JP) ................. 2016-118114

(51) Int. Cl.
| | |
|---|---|
| *C08K 5/00* | (2006.01) |
| *C08K 3/36* | (2006.01) |
| *C08L 9/06* | (2006.01) |
| *B01F 17/00* | (2006.01) |
| *B60C 1/00* | (2006.01) |
| *C08L 9/00* | (2006.01) |

(52) U.S. Cl.
CPC ............ *C08L 9/06* (2013.01); *B01F 17/005* (2013.01); *B60C 1/0016* (2013.01); *C08K 3/36* (2013.01); *C08K 5/0025* (2013.01); *B60C 1/00* (2013.01); *C08J 2300/10* (2013.01); *C08K 2201/002* (2013.01); *C08K 2201/006* (2013.01); *C08L 9/00* (2013.01)

(58) Field of Classification Search
CPC ..... C08K 5/00; C08K 3/36; C08L 9/06; B01F 17/00
USPC .......................................................... 524/492
See application file for complete search history.

(56) References Cited

U.S. PATENT DOCUMENTS

2018/0171116 A1* 6/2018 Sakurai ..................... C08J 3/20

FOREIGN PATENT DOCUMENTS

JP  2003-523472 A  8/2003

* cited by examiner

*Primary Examiner* — Deve E Valdez
(74) *Attorney, Agent, or Firm* — Oblon, McClelland, Maier & Neustadt, L.L.P.

(57) ABSTRACT

A method for manufacturing a tire rubber composition includes kneading a rubber component, a silane coupling agent and a silica having a BET specific surface area of 210 $m^2/g$ or more, adding a vulcanization accelerator to a first kneaded material including the rubber component, silane coupling agent and silica, kneading a first resulting mixture including the rubber component, silane coupling agent, silica and vulcanization accelerator such that a second kneaded material including the rubber component, silane coupling agent, silica and vulcanization accelerator is obtained, adding a vulcanization agent to the second kneaded material including the rubber component, silane coupling agent, silica and vulcanization accelerator, and kneading a second resulting mixture including the rubber component, silane coupling agent, silica, vulcanization accelerator and vulcanization agent. The first kneaded material has a pH of 6.5 or less, and the second kneaded material has a pH of 8.0 or more.

20 Claims, No Drawings

TIRE RUBBER COMPOSITION MANUFACTURING METHOD AND TIRE RUBBER COMPOSITION

CROSS-REFERENCE TO RELATED APPLICATIONS

The present application is based upon and claims the benefit of priority to Japanese Patent Application No. 2016-118114, filed Jun. 14, 2016, the entire contents of which are incorporated herein by reference.

BACKGROUND OF THE INVENTION

Field of the Invention

The present invention relates to a tire rubber composition manufacturing method and a tire rubber composition.

Description of Background Art

Japanese Translation of PCT International Application Publication No. 2003-523472 describes a tire rubber composition manufacturing method and a tire rubber composition. The entire contents of this publication are incorporated herein by reference.

SUMMARY OF THE INVENTION

According to one aspect of the present invention, a method for manufacturing a tire rubber composition includes kneading a rubber component, a silane coupling agent and a silica having a BET specific surface area of 210 m$^2$/g or more, adding a vulcanization accelerator to a first kneaded material including the rubber component, the silane coupling agent and the silica, kneading a first resulting mixture including the rubber component, the silane coupling agent, the silica and the vulcanization accelerator such that a second kneaded material including the rubber component, the silane coupling agent, the silica and the vulcanization accelerator is obtained, adding a vulcanization agent to the second kneaded material including the rubber component, the silane coupling agent, the silica and the vulcanization accelerator, and kneading a second resulting mixture including the rubber component, the silane coupling agent, the silica, the vulcanization accelerator and the vulcanization agent. The first kneaded material including the rubber component, the silane coupling agent and the silica has a pH of 6.5 or less, and the second kneaded material including the rubber component, the silane coupling agent, the silica and the vulcanization accelerator has a pH of 8.0 or more.

According to another aspect of the present invention, a tire rubber composition is obtained by a process including kneading a rubber component, a silane coupling agent and a silica having a BET specific surface area of 210 m$^2$/g or more, adding a vulcanization accelerator to a first kneaded material including the rubber component, the silane coupling agent and the silica, kneading a first resulting mixture including the rubber component, the silane coupling agent, the silica and the vulcanization accelerator such that a second kneaded material including the rubber component, the silane coupling agent, the silica and the vulcanization accelerator is obtained, adding a vulcanization agent to the second kneaded material including the rubber component, the silane coupling agent, the silica and the vulcanization accelerator, and kneading a second resulting mixture including the rubber component, the silane coupling agent, the silica, the vulcanization accelerator and the vulcanization agent. The first kneaded material including the rubber component, the silane coupling agent and the silica has a pH of 6.5 or less, and the second kneaded material including the rubber component, the silane coupling agent, the silica and the vulcanization accelerator has a pH of 8.0 or more.

DETAILED DESCRIPTION OF THE EMBODIMENTS

Embodiments will now be described.

A tire rubber composition according to an embodiment of the present invention includes a rubber component, a silane coupling agent, silica having a BET specific surface area of 210 m$^2$/g or more, a vulcanization accelerator and a vulcanization agent. The tire rubber composition manufacturing method includes: a base kneading process in which the rubber component, the silane coupling agent and the silica are kneaded and thereafter, the vulcanization accelerator is added and the resulting mixture is kneaded; and a finishing kneading process in which the vulcanization agent is added to the kneaded material obtained by the base kneading process and the resulting mixture is kneaded. In the base kneading process, the kneaded material after the rubber component, the silane coupling agent and the silica are kneaded has a pH of 6.5 or less, and the kneaded material after the vulcanization accelerator is kneaded has a pH of 8.0 or more.

A vulcanization accelerator is combined together with a vulcanization agent in a finishing stage of a kneading process. However, in an embodiment of the present invention, by adding in the base kneading process the vulcanization accelerator after the rubber component, the silane coupling agent and the silica are kneaded, a reaction between the silica and the silane coupling agent can be effectively promoted.

Further, in order for the silane coupling agent and the silica to bond to each other, a polycondensation reaction occurs between the silane coupling agent and the silica after a hydrolysis reaction of the silane coupling agent takes place. A pH is measured only for a water soluble substance. A pH is rarely measured for a hydrophobic substance such as a rubber composition. However, reaction speeds of a hydrolysis reaction and a polycondensation reaction are significantly affected by a pH of a kneaded material. By adjusting a pH of a kneaded material during kneading in the base kneading process, more specifically, by adjusting a pH of a kneaded material after the rubber component, the silane coupling agent and the silica are kneaded and a pH of a kneaded material after the vulcanization accelerator is kneaded, first, a hydrolysis reaction of the silane coupling agent at beginning of base kneading can be promoted and thereafter, a polycondensation reaction between the silane coupling agent and the silica in a later stage of the base kneading can be promoted, and bonding between the silane coupling agent and the silica can be efficiently generated.

In an embodiment of the present invention, the pH of a kneaded material is a value obtained by cutting the kneaded material into a square piece of 2 mm on each side and immersing the piece in distilled water, performing extracting at 90° C. for 15 minutes while irradiating microwave, and measuring a pH of the immersion water using a pH meter. Specifically, the pH of the kneaded material is a value measured using a method described in Examples (to be described later). Here, regarding the extraction, even when performing extraction for 1 hour using an ultrasonic cleaner or the like, a water soluble component cannot be completely extracted from interior of a rubber and thus an internal pH cannot be accurately obtained. However, by performing extraction using the present method, facts about the rubber can be obtained.

By the above effect, in an embodiment of the present invention, even for silica (so-called fine-particle silica) having a BET specific surface area of 210 m²/g or more, which is poor in dispersibility, the silica can be satisfactorily dispersed, and low fuel consumption performance, wear resistance and wet grip performance can be improved in a well-balanced manner.

A conventional technology for activating a silane coupling agent promotes both a reaction between silica and a silane coupling agent and a reaction between a rubber component and the silane coupling agent. These reactions are antagonistic to each other and thus the reactions are likely non-uniform. In contrast, in an embodiment of the present invention, in a kneading stage before vulcanization, a reaction between a rubber component and a silane coupling agent is suppressed and only a reaction between silica and the silane coupling agent is promoted. During vulcanization after the kneading, the reaction between the rubber component and the silane coupling agent is caused to proceed. Thereby, dispersibility of the silica is significantly improved and the silica and the rubber component can uniformly react with each other. This is thought to be a reason that, as compared to the conventional technology, excellent low fuel consumption performance, wear resistance and wet grip performance can be achieved. However, it is difficult to directly identify a state of such a rubber composition in terms of structure or characteristics.

In the following, details of the processes are described.

Base Kneading Process

In the base kneading process, a rubber component, a silane coupling agent and silica are kneaded and thereafter, a vulcanization accelerator is added and the resulting mixture is kneaded.

In the base kneading process, an combined amount of each of the rubber component, the silane coupling agent, the silica and the vulcanization accelerator may be a full amount (total amount used in all processes) or may be a part of the full amount. For a reason that the dispersion of the silica can be further promoted, it is preferable that the rubber component, the silane coupling agent and the silica be combined at their full amounts and kneaded in the base kneading process, and the vulcanization accelerator be partially added and kneaded in the base kneading process and the remaining vulcanization accelerator be added and kneaded in the finishing kneading process.

For the same reasons, before adding the vulcanization accelerator, the rubber component, the silane coupling agent and the silica are respectively combined at preferably 50 mass % or more, more preferably 70 mass % or more, even more preferably 90 mass % or more, and particularly preferably 100 mass % of their full amounts and are kneaded.

In the base kneading process, the rubber component, the silane coupling agent, the silica and the vulcanization accelerator may each be combined at once or may each be dividedly combined. For example, it is also possible that portions of the rubber component, the silane coupling agent and the silica are first kneaded and thereafter, the remaining rubber component, silane coupling agent and silica are combined together with the vulcanization accelerator and the resulting mixture is kneaded.

The kneading in the base kneading process may be performed in one stage or in two or more stages. In an embodiment of the present invention, one-stage kneading means a process in which components are combined and are kneaded and a kneaded material is discharged. Therefore, a case where components are combined at different times before a kneaded material is discharged is also one-stage kneading.

With regard to combine timing of the vulcanization accelerator, for example, when the kneading in the base kneading process is performed in one stage, it is possible that, first, the rubber component, the silane coupling agent and the silica are kneaded and thereafter, the vulcanization accelerator is added and the resulting mixture is kneaded. In this case, it is preferable to combine the vulcanization accelerator and knead the resulting mixture after the kneaded material obtaining by kneading the rubber component, the silane coupling agent and the silica is placed in a kneading machine for a predetermined period of time (preferably 30 seconds-5 minutes) while being adjusted to a predetermined temperature (preferably 130-160° C.).

Further, when the kneading in the base kneading process is performed in two stages, it is possible that, in a first stage of the kneading, the rubber component, the silane coupling agent and the silica are kneaded and the resulting kneaded material is temporarily discharged and thereafter, in a second stage of the kneading, together with the kneaded material obtained in the stage, the vulcanization accelerator is added and the resulting mixture is kneaded. When the kneading in the base kneading process is performed in the two stages and the vulcanization accelerator is added in the second stage, although the number of man-hours is increased, wasteful thermal history can be prevented from being added to the rubber component. Therefore, a hydrolysis reaction of the silane coupling agent, dispersion of the silica, and a polycondensation reaction between the silane coupling agent and the silica can be promoted in a well-balanced manner.

Before the vulcanization accelerator is added, a kneading time for kneading the rubber component, the silane coupling agent and the silica is preferably 30 seconds or more, more preferably 60 seconds or more, and even more preferably 80 seconds or more. When the kneading time is less than 30 seconds, there is a risk that the hydrolysis reaction of the silane coupling agent cannot be sufficiently progressed. An upper limit of the kneading time is not particularly limited, but is preferably 30 minutes or less, and more preferably 5 minutes or less. When the kneading time exceeds 30 minutes, there is a risk that the rubber component may deteriorate and the wear resistance may decrease. Further, kneading time after the vulcanization accelerator is added is not particularly limited, but is preferably 30 seconds-30 minutes, and more preferably 80 seconds-5 minutes.

As described above, in an embodiment of the present invention, the pH of the kneaded material in the base kneading process is adjusted to a predetermined range. The pH of the kneaded material is significantly affected by the components such as silica to be blended. However, since highly polar compounding agents such as a stearic acid, a vulcanization accelerator, and an amine-based anti-aging agent are not water soluble, their blending amounts do not directly affect the pH. However, since a highly polar compounding agent affects the pH by reacting with a surface functional group of the silica, it is important to control the pH of the whole composition by taking this point into account.

In the base kneading process, the pH of the kneaded material after the rubber component, the silane coupling agent and the silica are kneaded, that is, the kneaded material before the vulcanization accelerator is added, is 6.5 or less, preferably 6.0 or less, more preferably 5.5 or less, even more preferably 5.0 or less, and particularly preferably 4.5 or less. When the pH exceeds 6.5, there is a risk that the hydrolysis reaction of the silane coupling agent is not sufficiently promoted, an amount of unreacted silane coupling agent increases, and wear resistance and wet grip performance cannot be sufficiently improved. Further, when the pH exceeds 6.5, there is a risk that a polycondensation reaction between molecules of the silane coupling agent progresses more than the hydrolysis reaction of the silane coupling agent so that gelation occurs and aggregation between silica particles becomes strong, and thus dispersion of the silica is inhibited and it becomes difficult for the reaction between the silane coupling agent and the silica to progress, and, as a result, the effect of improving wear resistance and wet grip performance may be impaired and processability mat deteriorate. Further, in a case where a modified rubber having functional groups that react with the silica is used, when the pH exceeds 6.5, there is a risk that a condensation reaction between the functional groups progresses and a reaction between the silica and the functional group is inhibited.

In the base kneading process, the pH of the kneaded material after the rubber component, the silane coupling agent and the silica are kneaded is preferably 2.0 or more, more preferably 2.5 or more, even more preferably 3.0 or more, and particularly preferably 3.5 or more. When the pH is less than 2.0, there is a risk that the hydrolysis reaction rapidly occurs and the polycondensation reaction between molecules of the silane coupling agent also occurs, and thus, the reaction between the silane coupling agent and the silica is inhibited. Further, there is a risk that, due to acidic substances, the rubber component may deteriorate.

In the base kneading process, the pH of the kneaded material after the vulcanization accelerator is kneaded is 8.0° more, and preferably 8.5 or more. When the pH is less than 8.0, there is a risk that the reaction between the silane coupling agent and the rubber component progresses in a state in which the polycondensation reaction between the silane coupling agent and the silica does not proceed sufficiently, so that good wear resistance and wet grip performance cannot be obtained. An upper limit of the pH is not particularly limited, but is preferably 13 or less. When the pH exceeds 13, there is a risk that the polycondensation reaction between the silane coupling agent and the silica excessively progresses so that gelation occurs and wear resistance may decrease.

Examples of the rubber component that is combined in the base kneading process include diene-based rubbers such as natural rubber (NR), epoxidized natural rubber (ENR), isoprene rubber (IR), butadiene rubber (BR) and styrene butadiene rubber (SBR). These rubbers may each be independently used, or two or more of these rubbers may be used in combination. Among these rubbers, SBR and BR are preferable, and BR is more preferable. Further, from a point of view of low fuel consumption performance, wear resistance and wet grip performance, it is preferable to use a high cis BR having a cis content of 70 mass % or more and a weight-average molecular weight of 300,000 or more as BR. In an embodiment of the present invention, a cis content is a value calculated based on an infrared absorption spectrum analysis, and a weight-average molecular weight is a value obtained by standard polystyrene conversion based on a measured value using a gel permeation chromatograph (GPC) (GPC-8000 series manufactured by Tosoh Corporation; detector: differential refractometer; column: TSKGEL SUPERMULTIPORE HZ-M manufactured by Tosoh Corporation).

From a point of view of low fuel consumption performance, wear resistance and wet grip performance, SBR and high cis BR are preferably respectively modified SBR and modified high cis BR each having a functional group that reacts with silica. The functional group is not particularly limited. However, examples of the functional group include an alkoxysilyl group, an amino group, a hydroxyl group, a carboxy group, an amide group, an epoxy group, an imino group, a cyano group and the like. These functional groups may each be introduced into either a terminal of a polymer chain or into a main chain, and multiple functional groups may be introduced into a polymer chain. Among these functional groups, for a reason that a strong bond can be formed with silica, the alkoxysilyl group and the amide group are preferable, and the alkoxysilyl group is more preferable.

When the modified rubbers such as the modified SBR and the modified high cis BR are used, Mooney viscosity rises and the components become difficult to disperse. Therefore, the reaction of the silane coupling agent cannot uniformly proceed, and wear resistance may decrease. However, in a kneading method according to an embodiment of the present invention, the components can be satisfactorily dispersed and thus, a decrease in wear resistance due to the use of the modified rubbers can be suppressed.

The silane coupling agent that is combined in the base kneading process is not particularly limited. However, examples of the silane coupling agent include sulfide-based, vinyl-based, amino-based, glycidoxy-based, nitro-based, and chloro-based silane coupling agents and the like. These silane coupling agents may each be independently used, or two or more of these silane coupling agents may be used in combination. Among these silane coupling agents, a sulfide-based silane coupling agent is preferable, and a bis(3-triethoxysilylpropyl) disulfide is more preferable.

The silica that is combined in the base kneading process is so-called fine-particle silica having a BET specific surface area of 210 $m^2/g$ or more. The fine-particle silica has characteristics such as having an excellent reinforcing property and being excellent in improving wear resistance. However, the fine-particle silica has a low dispersibility and thus, due to poor dispersion, wear resistance may decrease. In contrast, in a kneading method according to an embodiment of the present invention, even the fine-particle silica can be satisfactorily dispersed and thus, the effect of improving wear resistance due to the fine-particle silica can be sufficiently achieved.

In an embodiment of the present invention, together with the fine-particle silica, other silica (such as silica having a BET specific surface area of less than 210 $m^2/g$) may be used in combination.

From a point of view of wear resistance, the BET specific surface area of the fine-particle silica is preferably 215 $m^2/g$ or more, and more preferably 220 $m^2/g$ or more. An upper limit of the BET specific surface area is not particularly limited. However, from a point of view of operability and processability, the BET specific surface area is preferably 400 $m^2/g$ or less, and more preferably 300 $m^2/g$ or less.

In an embodiment of the present invention, the BET specific surface area is a value measured according to ASTM D3037-81.

From a point of view of an effect of promoting the reaction of the silane coupling agent, the pH of the fine-particle silica is preferably 4.0 or more and 9.5 or less, and more preferably 5.5 or more and 7.0 or less.

In an embodiment of the present invention, the pH of the fine-particle silica is a value measure according to JIS K1150.

The vulcanization accelerator that is combined in the base kneading process is not particularly limited. However, examples of the vulcanization accelerator include guanidines, sulfenamides, thiazoles, thiurams, dithiocarbamates, thioureas, xanthogenates, and the like. These vulcanization accelerators may each be independently used, or two or more of these vulcanization accelerators may be used in combination. Among these vulcanization accelerators, for a reason that the effect according to an embodiment of the present invention can be satisfactorily obtained, the guanidines are preferable. Due to a function of the guanidines as soft bases, the polycondensation reaction between the silane coupling agent and the silica is selectively promoted, and the silica is satisfactorily dispersed, and thus, the effect of improving low fuel consumption performance, wear resistance and wet grip performance can be improved.

Examples of the guanidines include 1,3-diphenylguanidine, 1,3-di-o-tolylguanidine, 1-o-tolyl biguanide, di-o-tolylguanidine salt of di-catecholborate, 1,3-di-o-cumenylguanidine, 1,3-di-o-biphenylguanidine, 1,3-di-o-cumenyl-2-propionylguanidine, and the like. These guanidines may each be independently used, or two or more of these guanidines may be used in combination. Among these guanidines, 1,3-diphenylguanidine, 1,3-di-o-tolylguanidine, and 1-o-tolyl biguanide are preferable, and 1,3-diphenylguanidine is more preferable.

In the base kneading process, the combined amount of the vulcanization accelerator, with respect to 100 parts by mass of the combined amount of the silica, is preferably 0.1-20 parts by mass, more preferably 0.5-5 parts by mass, and even more preferably 1-3 parts by mass. When the combined amount of the vulcanization accelerator is less than 0.1 parts by mass, there is a risk that the effect of promoting the polycondensation reaction between the silane coupling agent and the silica is not sufficiently obtained, and when the combined amount of the vulcanization accelerator exceeds 20 parts by mass, there is a risk that it may become difficult to control a vulcanization process that is performed after the finishing kneading process and wear resistance may decrease.

In the kneaded material obtained by the base kneading process, that is, the kneaded material to which the vulcanization agent is to be added in the finishing kneading process, a non-reaction rate of the silane coupling agent is preferably less than 20%. When the non-reaction rate of the silane coupling agent is in the above range, the reaction of the silane coupling agent is sufficiently progressed and thus satisfactory low fuel consumption performance, wear resistance and wet grip performance can be obtained.

In an embodiment of the present invention, the non-reaction rate of the silane coupling agent is a ratio of a portion of the silane coupling agent combined in the base kneading process that is assumed to have not bonded to silica, and can be measured using a method of Examples to be described later.

In the base kneading process, it is also possible that, in addition to the rubber component, the silane coupling agent, the silica and the vulcanization accelerator described above, other components are added and the resulting mixture is kneaded. The other components are not particularly limited as long as the components are other than the vulcanization agent to be added in the finishing kneading process. However, examples of the other components include carbon black, oil, stearic acid, anti-aging agent, zinc oxide, and the like.

A kneading method for the base kneading process is not particularly limited. For example, a kneading machine such as a Banbury mixer or a kneader can be used. Further, a kneading time (kneading time of the entire base kneading process) is preferably 3-20 minutes, and a rubber temperature (temperature of the kneaded material) during kneading is preferably 130-160° C.

Finishing Kneading Process

In the finishing kneading process, the vulcanization agent is added to the kneaded material obtained by the base kneading process and the resulting mixture is kneaded.

The vulcanization agent that is added in the finishing kneading process is not particularly limited as long as the vulcanization agent is a chemical capable of cross-linking the rubber component. For example, sulfur and the like can be used. Further, a hybrid cross-linking agent (organic cross-linking agent) can also be used as a vulcanization agent in an embodiment of the present invention. These vulcanization agents may each be independently used, or two or more of these vulcanization agents may be used in combination. Among these vulcanization agents, sulfur is preferable.

In the finishing kneading process, it is also possible that, in addition to the vulcanization agent, other components are added and the resulting mixture is kneaded. Examples of the other components include a vulcanization accelerator, stearic acid, and the like.

As a vulcanization accelerator that is combined in the finishing kneading process, a vulcanization accelerator same as the vulcanization accelerator that is combined in the base kneading process can be used, but sulfenamides are preferable. Due to the sulfenamides, cross-linking is uniformized, and low fuel consumption performance, wear resistance and wet grip performance are further improved.

Examples of the sulfenamides include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-dipentyl-2-benzothiazolylsulfenamide, N,N-dioctyl-2-benzothiazolylsulfenamide, N,N-di-2-ethylhexyl benzothiazolylsulfenamide, N-decyl-2-benzothiazolylsulfenamide, N,N-didodecyl-2-benzothiazolylsulfenamide, N,N-distearyl-2-benzothiazolylsulfenamide, and the like. These sulfenamides may each be independently used, or two or more of these sulfenamides may be used in combination. Among these sulfenamides, N-cyclohexyl-2-benzothiazolylsulfenamide and N-tert-butyl-2-benzothiazolylsulfenamide are preferable, and N-tert-butyl-2-benzothiazolylsulfenamide is more preferable.

A kneading method for the finishing kneading process is not particularly limited. For example, a kneading machine such as an open roll can be used. Further, a kneading time is preferably 1-15 minutes, and a rubber temperature during kneading (temperature of the kneaded material) is preferably 80-120° C.

Vulcanization Process

In the vulcanization process, the kneaded material (unvulcanized rubber composition) obtained by the finishing kneading process is vulcanized. More specifically, the unvulcanized rubber composition is extruded according to a shape of a tire member such as a tread and is molded on a tire molding machine using an ordinary method, and is bonded together with other tire members to form an unvulcanized tire, which is then heated and pressed in a vulcanizer. Thereby, a tire can be manufactured. Vulcanization temperature is preferably from 150 to 200° C., and vulcanization time is preferably from 5 to 15 minutes.

For a reason that good low fuel consumption performance, wear resistance and wet grip performance can be obtained in a well-balanced manner, in a rubber composition obtained using a manufacturing method according to an embodiment of the present invention, a content of the high cis BR in 100 mass % of the rubber component preferably exceeds 20 mass % and is 80 mass % or less, and is more preferably 25 mass % or more and 70 mass % or less.

For a reason that low fuel consumption performance, wear resistance and wet grip performance can be obtained in a well-balanced manner, in a rubber composition obtained using a manufacturing method according to an embodiment of the present invention, a content of SBR in 100 mass % of the rubber component is preferably 20 mass % or more and less than 80 mass %, and more preferably 30 mass % or more and 75 mass % or less.

For a reason that low fuel consumption performance, wear resistance and wet grip performance can be obtained in a well-balanced manner, in a rubber composition obtained using a manufacturing method according to an embodiment of the present invention, a content of the fine-particle silica with respect to 100 parts by mass of the rubber component is preferably 10 parts by mass or more, more preferably 20 parts by mass or more, and even more preferable 60 parts by mass or more, and is preferably 300 parts by mass or less, and more preferably 150 parts by mass or less.

For the same reason, in a rubber composition obtained using a manufacturing method according to an embodiment of the present invention, a content of the silica (a total amount of the fine-particle silica and other silica) the with respect to 100 parts by mass of the rubber component is preferably 10 parts by mass or more, more preferably 20 parts by mass or more, and even more preferable 60 parts by mass or more, and is preferably 300 parts by mass or less, and more preferably 150 parts by mass or less.

For a reason that low fuel consumption performance, wear resistance and wet grip performance can be obtained in a well-balanced manner, in a rubber composition obtained using a manufacturing method according to an embodiment of the present invention, a content of the silane coupling agent with respect to 100 parts by mass of the silica is preferably 1 part by mass or more and 10 parts by mass or less, and more preferably 3 parts by mass or and 6 parts by mass or less.

For a reason that low fuel consumption performance, wear resistance and wet grip performance can be obtained in a well-balanced manner, in a rubber composition obtained using a manufacturing method according to an embodiment of the present invention, a content of the vulcanization accelerator with respect to 100 parts by mass of the rubber component is preferably 0.5 parts by mass or more and 10 parts by mass or less, and more preferably 1.5 parts by mass or and 6 parts by mass or less.

For a reason that low fuel consumption performance, wear resistance and wet grip performance can be obtained in a well-balanced manner, in a rubber composition obtained using a manufacturing method according to an embodiment of the present invention, a content of the vulcanization agent with respect to 100 parts by mass of the rubber component is preferably 0.1 parts by mass or more and 8 parts by mass or less, and more preferably 0.5 parts by mass or and 5 parts by mass or less.

EXAMPLES

Based on examples, the present invention is described in detail. However, the present invention is not limited to only these examples.

In the following, various chemicals in Examples and Comparative Examples are collectively described.

SBR 1: Manufacturing Example 1

BR 1: Manufacturing Example 2

Silica 1: Ultrasil 9000GR (BET: 240 $m^2/g$; CTAB: 200 $m^2/g$; pH: 6.9) manufactured by Evonik Degussa Corporation Silica 2: ZEOSIL P200MP (BET: 220 $m^2/g$; CTAB: 200 $m^2/g$; pH: 6.3) manufactured by Rhodia Corporation Silica 3: Nipsil AQ (BET: 200 $m^2/g$; CTAB: 155 $m^2/g$; pH: 6.0) manufactured by Tosoh Silica Corporation Silica 4: Prototype wet silica (BET: 225 $m^2/g$; CTAB: 200 $m^2/g$; pH: 9.5)

Silica 5: Zeosil 1115MP (BET: 115 $m^2/g$; CTAB: 110 $m^2/g$; pH: 6.7) manufactured by Rhodia Corporation Silane coupling agent: Si75 (bis-(3-triethoxysilylpropyl) disulfide) manufactured by Evonik Degussa Corporation Carbon black: Diablack I (ISAF class) (N2SA: 114 $m^2/g$) manufactured by Mitsubishi Chemical Corporation Oil: High oleic acid sunflower oil (Oleic acid ratio: 82%; polyunsaturated fatty acid ratio: 9%; saturated fatty acid ratio: 9%) manufactured by Olisoy Corporation Stearic acid: Bead stearic acid camellia manufactured by NOF Corporation Anti-aging agent: Nocrac 6C (N-(1,3-dimethylbutyl)-N-phenyl-p-phenylenediamine) manufactured by Ouchi Shinko Chemical Industry Corporation Zinc oxide: Two kinds of zinc oxide manufactured by Mitsui Mining & Smelting Co., Ltd.

Sulfur: Powdered sulfur manufactured by Tsurumi Chemical Industry Co., Ltd.

Vulcanization accelerator 1: Nocceler D (N,N'-diphenyl-guanidine) manufactured by Ouchi Shinko Chemical Industry Co., Ltd.

Vulcanization accelerator 2: Nocceler NS (N-tert-butyl-2-benzothiazolyl sulfenamide) manufactured by Ouchi Shinko Chemical Industry Co., Ltd.

Manufacturing Example 1: SBR 1 (Modified SBR)

36 g of 3-aminopropylmethyldiethoxysilane (manufactured by Gelest Corporation) is added as an aminosilane group to 400 mL of a dichloromethane solvent in a glass flask equipped with a stirrer under a nitrogen atmosphere. Thereafter, 48 mL of trimethylsilane chloride (manufactured by Aldrich Corporation) and 53 mL of triethylamine are further added as protected groups to the solution, and the resulting mixture is stirred for 17 hours at room temperature. Thereafter, by applying the reaction solution to an evaporator, the solvent is removed and a reaction mixture is obtained. By subjecting the obtained reaction mixture to reduced-pressure distillation under a pressure of 665 Pa, as a fraction at 130-135° C., 40 g of N,N-bis(trimethylsilyl) aminopropylmethyldiethoxysilane, which is a modifying agent, is obtained.

Next, in an autoclave reactor having an internal capacity of 5 L (liter) replaced with nitrogen, 2,750 g of cyclohexane, 16.8 mmol of tetrahydrofuran, 125 g of styrene and 375 g of 1,3-butadiene are combined. After adjusting a temperature of the reactor contents to 10° C., 1.2 mmol of n-butyllithium is added and polymerization is started.

At time when a polymerization conversion rate reached 99%, 10 g of butadiene is added, and polymerization is further caused to proceed for 5 minutes. 1.1 mmol of N,N-bis(trimethylsilyl) aminopropylmethyldiethoxysilane obtained above is added and a modification reaction is caused to proceed for 15 minutes. Thereafter, 0.6 mmol of tetrakis (2-ethyl-1,3-hexanediolato) titanium is added and the resulting mixture is further stirred for 15 minutes. Finally, 2,6-di-tert-butyl-p-cresol is added to the polymer solution after the reaction. Next, steam stripping is performed and the rubber is dried with a hot roll adjusted to 110° C. and SBR 1 (modified SBR) is obtained. The obtained SBR 1 had a glass transition temperature (Tg) of −38° C., a bonded styrene content of 24.5 mass %, and a conjugated diene portion vinyl content of 56 mol %.

Manufacturing Example 2: BR 1 (Modified High Cis BR)

2.4 kg of cyclohexane and 300 g of 1,3-butadiene are combined to a 5 L autoclave under a nitrogen atmosphere. To these, a catalyst is combined, which is prepared in advance by causing a cyclohexane solution of neodymium versatate (0.09 mmol), a toluene solution of methylalumoxane (1.0 mmol), a toluene solution of diisobutylaluminum hydride (3.5 mmol) and diethylaluminum chloride (0.18 mmol), and 1,3-butadiene (4.5 mmol) to react and age at 50° C. for 30 minutes, and a polymerization reaction is caused to proceed for 45 minutes.

Next, while a reaction temperature is kept at 60° C., a toluene solution of 3-glycidoxypropyltrimethoxysilane (4.5 mmol) is added and a reaction is caused to proceed for 30 minutes, and active terminal groups of a polymer are modified. Thereafter, a methanol solution containing 1.5 g of 2,4-di-tert-butyl-p-cresol is added.

Next, the above-obtained modified polymer solution is added to 20 L of an aqueous solution adjusted to pH 10 using sodium hydroxide. The resulting solution is subjected to desolvation at 110° C. for two hours and thereafter is dried using a hot roll at 110° C., and BR 1 (modified high cis BR) is obtained. The obtained BR 1 had a cis content of 97 mass %, a vinyl content of 1.1 mass %, and an Mw of 350,000.

Manufacturing Example 3: Example 1-3, Comparative Example 1 and 2

Using a Banbury mixer, chemicals described in Combine 1 of Process 1 in Table 1 are combined and the resulting mixture is kneaded for 3 minutes while adjusting the rubber temperature (temperature of the kneaded material) to about 150° C. Thereafter, the kneaded material is held in the Banbury mixer for 1 minute while the rubber temperature is adjusted to about 155° C.

Next, chemicals described in Combine 2 of Process 1 are combined to the Banbury mixer and the resulting mixture is kneaded for 3 minutes while the rubber temperature is adjusted to about 150° C. and thereafter, the kneaded material is discharged. Thereafter, the discharged kneaded material and chemicals described in Process 3 are combined into an open roll and are kneaded for 3 minutes while the rubber temperature is adjusted to about 110° C., and an unvulcanized rubber composition is obtained.

The obtained unvulcanized rubber composition is molded into a shape of a tread and is bonded together with other tire members on a tire molding machine to form an unvulcanized tire. The unvulcanized tire is vulcanized at 170° C. for 10 minutes and a test tire (size: 195/65R15; a tire for a passenger car) is manufactured.

Manufacturing Example 4: Example 4

Using a Banbury mixer, chemicals described in Process 1 in Table 2 are kneaded for 3 minutes while the rubber temperature is adjusted to about 150° C. and thereafter the kneaded material is temporarily discharged. Next, the discharged kneaded material, together with chemicals described in Process 2, is re-combined to the Banbury mixer, and the mixture is kneaded for 3 minutes while the rubber temperature is adjusted to about 150° C. With other conditions the same as in Manufacturing Example 3, a test tire is manufactured.

Manufacturing Example 5: Comparative Example 3 and 4

Using a Banbury mixer, chemicals described in Process 1 in Table 3 are kneaded for 6 minutes while the rubber temperature is adjusted to about 150° C. and thereafter the kneaded material is discharged. Thereafter, the discharged kneaded material and chemicals described in Process 3 are combined into an open roll and are kneaded for 3 minutes while the rubber temperature is adjusted to about 110° C. With other conditions the same as in Manufacturing Example 3, a test tire is manufactured.

The following evaluations are performed with respect to the obtained test tires and the like. The results are shown in Table 1-3.

pH of Kneaded Material 5 g of the kneaded rubber is cut into a piece with a total length of 5 mm or less on three sides (about 1-2× about 1-2× about 1-2 (mm)) and is placed in a 100 ml beaker. 50 ml of distilled water at a normal temperature is added and the temperature is raised to 90° C. in 2 minutes. Thereafter, while the temperature is adjusted to be maintained at 90° C., microwave (300 W) is irradiated for 13 minutes (total 15 minutes). Next, the immersion water is cooled to 25° C. using an ice bath and the pH of the immersion water is measured using a pH meter.

For Example 1-3 and Comparative Example 1 and 2, the pH of the kneaded material after Combine 1 of Process 1 is performed and the pH of the kneaded material after Combine 2 of Process 1 is performed are measured and the results are respectively listed in pH 1 and pH 2 rows in Table 1.

For Example 4, the pH of the kneaded material after Process 1 is performed, and the pH of the kneaded material after Process 2 is performed, are measured and the results are respectively listed in pH 1 and pH 2 rows in Table 2.

For Comparative Example 3 and 4, the pH of the kneaded material after Process 1 is performed is measured and the result is listed in a pH 2 row in Table 3.

Non-Reaction Rate of Silane Coupling Agent

With respect to a kneaded material after the base kneading process, a non-reaction rate is obtained from a peak area of an unreacted portion of the silane coupling agent extracted using a liquid chromatography. Specifically, from each kneaded material, an unreacted portion of the silane coupling agent is extracted using acetone and a peak area (peak area 1) of the unreacted portion of the silane coupling agent is measured using a liquid phase chromatography method. Then, with respect to a reference solution containing the same amount of silane coupling agent as the silane coupling agent used in each kneaded material, the same procedure is performed and a peak area (peak area 2) is measured. From a ratio of the obtained peak area 1 to the obtained peak area 2, the non-reaction rate (%) of the silane coupling agent of the kneaded material after the base kneading process is calculated.

Low Fuel Consumption Performance

Using a rolling resistance testing machine, rolling resistance of each test tire is measured when the test tire is mounted to a rim of 15×6JJ, is filled with air at an internal pressure of 230 kPa, is loaded with a load of 3.43 IN, and is caused to travel at a speed of 80 km/h. The result is expressed as an index number with a result of Comparative Example 1 as 100. A larger index number indicates a smaller rolling resistance and a better low fuel consumption performance.

Wear Resistance

Each test tire is mounted on a domestic FF car. A groove depth of a tire tread part of the tire after a mileage of 8000 km is measured. A mileage when the groove depth of the tire decreased by 1 mm is calculated. The result is expressed as an index number with a result of Comparative Example 1 as 100. A larger index number indicates a larger mileage when the groove depth of the tire decreased by 1 mm, and a better wear resistance.

Wet Grip Performance

The test tires are mounted on all wheels of a vehicle (domestically produced FF 2000 cc). A braking distance from an initial speed of 100 km/h on a wet asphalt road surface is obtained, and the result is expressed as an index number with a result of Comparative Example 1 as 100. A larger index number indicates a shorter braking distance and a better wet grip performance (wet skid performance).

Processability

Mooney viscosity (ML 1+4) of each unvulcanized rubber composition is measured at 130° C. according to JIS K6300, and the result is expressed as an index number with a result of Comparative Example 1 as 100. A larger index number indicates a lower Mooney viscosity and a better processability.

TABLE 1

| | | | | Example | | | Comparative Example | |
|---|---|---|---|---|---|---|---|---|
| | | | | 1 | 2 | 3 | 1 | 2 |
| Compounding amounts (parts by mass) | Base kneading process | Process 1 Combine 1 | SBR 1 | 70 | 70 | 70 | 70 | 70 |
| | | | BR 1 | 30 | 30 | 30 | 30 | 30 |
| | | | Silica 1 | 90 | — | 70 | — | — |
| | | | Silica 2 | — | 90 | — | — | — |
| | | | Silica 3 | — | — | — | 90 | — |
| | | | Silica 4 | — | — | — | — | 90 |
| | | | Silane coupling agent | 4 | 4 | 4 | 4 | 4 |
| | | | Carbon black | 5 | 5 | 5 | 5 | 5 |
| | | | Oil | 5 | 5 | 5 | 5 | 5 |
| | | | Stearic acid | 0.5 | 0.5 | 0.5 | 0.5 | — |
| | | Process 1 Combine 2 | Silica 5 | — | — | 20 | — | — |
| | | | Vulcanization accelerator 1 | 1 | 1 | 1 | 1 | — |
| | | | Anti-aging agent | 2 | 2 | 2 | 2 | 2 |
| | | | Zinc oxide | 2 | 2 | 2 | 2 | 2 |
| | Finishing kneading process | Process 3 | Sulfur | 1.5 | 1.5 | 1.5 | 1.5 | 1.5 |
| | | | Stearic acid | 1 | 1 | 1 | 1 | 1.5 |
| | | | Vulcanization accelerator 1 | 0.5 | 0.5 | 0.5 | 0.5 | 1.5 |
| | | | Vulcanization accelerator 2 | 1.5 | 1.5 | 1.5 | 1.5 | 1.5 |
| Measured values | pH 1 | | | 4.2 | 4.0 | 3.8 | 4.0 | 8.9 |
| | pH 2 | | | 9.5 | 9.1 | 9.3 | 9.2 | 10.3 |
| | Silane coupling agent non-reaction rate (%) | | | 4.2 | 3.5 | 6.2 | 8.4 | 26 |
| Performances | Low fuel consumption performance index number | | | 108 | 110 | 120 | 100 | 98 |
| | Wear resistance index number | | | 125 | 120 | 100 | 100 | 95 |
| | Wet grip performance index number | | | 118 | 115 | 102 | 100 | 94 |
| | Processability index number | | | 100 | 102 | 127 | 100 | 89 |

TABLE 2

| | | | | Example 4 |
|---|---|---|---|---|
| Compounding amounts (parts by mass) | Base kneading process | Process 1 | SBR 1 | 70 |
| | | | BR 1 | 30 |
| | | | Silica 1 | 90 |
| | | | Silica 2 | — |
| | | | Silica 3 | — |
| | | | Silica 4 | — |
| | | | Silane coupling agent | 4 |
| | | | Carbon black | 5 |
| | | | Oil | 5 |
| | | | Stearic acid | 0.5 |

TABLE 2-continued

| | | | | Example 4 |
|---|---|---|---|---|
| | | Process 2 | Silica 5 | — |
| | | | Vulcanization accelerator 1 | 1 |
| | | | Anti-aging agent | 2 |
| | | | Zinc oxide | 2 |
| | Finishing kneading process | Process 3 | Sulfur | 1.5 |
| | | | Stearic acid | 1 |
| | | | Vulcanization accelerator 1 | 0.5 |
| | | | Vulcanization accelerator 2 | 1.5 |
| Measured values | pH 1 | | | 4.1 |
| | pH 2 | | | 9.5 |
| | Silane coupling agent non-reaction rate (%) | | | 1.5 |
| Performances | Low fuel consumption performance index number | | | 110 |
| | Wear resistance index number | | | 130 |
| | Wet grip performance index number | | | 112 |
| | Processability index number | | | 106 |

TABLE 3

| | | | | Comparative Example | |
|---|---|---|---|---|---|
| | | | | 3 | 4 |
| Compounding amounts (parts by mass) | Base kneading process | Process 1 | SBR 1 | 70 | 70 |
| | | | BR 1 | 30 | 30 |
| | | | Silica 1 | 90 | — |
| | | | Silica 2 | — | — |
| | | | Silica 3 | — | 90 |
| | | | Silica 4 | — | — |
| | | | Silane coupling agent | 4 | 4 |
| | | | Carbon black | 5 | 5 |
| | | | Oil | 5 | 5 |
| | | | Stearic acid | 1.5 | 1.5 |
| | | | Silica 5 | — | — |
| | | | Vulcanization accelerator 1 | — | — |
| | | | Anti-aging agent | 2 | 2 |
| | | | Zinc oxide | 2 | 2 |
| | Finishing kneading process | Process 3 | Sulfur | 1.5 | 1.5 |
| | | | Stearic acid | — | — |
| | | | Vulcanization accelerator 1 | 1.5 | 1.5 |
| | | | Vulcanization accelerator 2 | 1.5 | 1.5 |
| Measured values | pH 1 | | | — | — |
| | pH 2 | | | 9.7 | 4.1 |
| | Silane coupling agent non-reaction rate (%) | | | 32 | 23 |
| Performances | Low fuel consumption performance index number | | | 95 | 97 |
| | Wear resistance index number | | | 91 | 90 |
| | Wet grip performance index number | | | 89 | 87 |
| | Processability index number | | | 84 | 98 |

From Table 1-3, it becomes clear that low fuel consumption performance, wear resistance and wet grip performance are improved in a well-balanced manner and good processability is obtained for tires of the examples obtained using the manufacturing method that includes: the base kneading process in which the rubber component, the silane coupling agent and the silica (silica 1, 2, 4) having a BET specific surface area of 210 m²/g or more are kneaded and thereafter the vulcanization accelerator is added and the resulting mixture is kneaded; and the finishing kneading process in which the vulcanization agent (sulfur) is added to the kneaded material obtained by the base kneading process and the resulting mixture is kneaded, and in which the pH (pH 1) of the kneaded material after the rubber component, the silane coupling agent and the silica are kneaded is 6.5 or less, and the pH (pH 2) of the kneaded material after the vulcanization accelerator is kneaded is 8.0 or more.

Further, from the results of Example 1 and Comparative Example 1, 3 and 4, it is clear that the performance improvement effect is larger in the case where a method according to an embodiment of the present invention is applied to a rubber composition containing silica having a BET specific surface area of 210 m²/g or more as compared to the case where the same method is applied to a rubber composition containing other silica.

In a tire rubber composition, in order to improve low fuel consumption performance, wear resistance and wet grip performance in a well-balanced manner, a technology in which silica and a silane coupling agent are blended may be used.

A silane coupling agent reacts with both silica and a polymer. For a purpose of promoting dispersion of silica and activating a silane coupling agent, in the past, improvements in kneading methods and in blending chemicals have been studied (for example, see Japanese Translation of PCT International Application Publication No. 2003-523472). However, in recent years, further improvement is demanded.

A tire rubber composition manufacturing method according to one aspect of the present invention improves low fuel consumption performance, wear resistance and wet grip performance in a well-balanced manner.

The present invention relates to a tire rubber composition manufacturing method for manufacturing a tire rubber composition. A tire rubber composition according to an embodiment of the present invention includes a rubber component, a silane coupling agent, silica having a BET specific surface area of 210 m²/g or more, a vulcanization accelerator and a vulcanization agent. The tire rubber composition manufacturing method includes: a base kneading process in which the rubber component, the silane coupling agent and the silica are kneaded and thereafter, the vulcanization accelerator is added and the resulting mixture is kneaded; and a finishing kneading process in which the vulcanization agent is added to the kneaded material obtained by the base kneading process and the resulting mixture is kneaded. In the base kneading process, the kneaded material after the rubber component, the silane coupling agent and the silica are kneaded has a pH of 6.5 or less, and the kneaded material after the vulcanization accelerator is kneaded has a pH of 8.0 or more.

It is preferable that the rubber component contain a high cis butadiene rubber that has a cis content of 70 mass % or more and a weight-average molecular weight of 300,000 or more, and a content of the high cis butadiene rubber exceed 20 mass % in 100 mass % of the rubber component.

It is preferable that the high cis butadiene rubber be a modified high cis butadiene rubber having a functional group that reacts with silica.

It is preferable that, in the kneaded material obtained by the base kneading process, a non-reaction rate of the silane coupling agent be less than 20%.

The present invention further relates to a tire rubber composition that includes a rubber component, a silane coupling agent, silica having a BET specific surface area of 210 m²/g or more, a vulcanization accelerator and a vulcanization agent. A tire rubber composition according to another embodiment of the present invention is obtained by a tire rubber composition manufacturing method that includes: a base kneading process in which the rubber component, the silane coupling agent and the silica are kneaded and thereafter, the vulcanization accelerator is added and the resulting mixture is kneaded; and a finishing kneading process in which the vulcanization agent is added to the kneaded material obtained by the base kneading process and the resulting mixture is kneaded. In the base kneading process, the kneaded material after the rubber component, the silane coupling agent and the silica are kneaded has a pH of 6.5 or less, and the kneaded material after the vulcanization accelerator is kneaded has a pH of 8.0 or more.

According to an embodiment of the present invention, a tire rubber composition manufacturing method for manufacturing a tire rubber composition is provided. The tire rubber composition includes a rubber component, a silane coupling agent, silica having a BET specific surface area of $210 \, m^2/g$ or more, a vulcanization accelerator and a vulcanization agent. The tire rubber composition manufacturing method includes: a base kneading process in which the rubber component, the silane coupling agent and the silica are kneaded and thereafter, the vulcanization accelerator is added and the resulting mixture is kneaded; and a finishing kneading process in which the vulcanization agent is added to the kneaded material obtained by the base kneading process and the resulting mixture is kneaded. In the base kneading process, the kneaded material after the rubber component, the silane coupling agent and the silica are kneaded has a pH of 6.5 or less, and the kneaded material after the vulcanization accelerator is kneaded has a pH of 8.0 or more. Therefore, a tire rubber composition can be manufactured that allows low fuel consumption performance, wear resistance and wet grip performance to be improved in a well-balanced manner.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a tire rubber composition, comprising:
   kneading a rubber component, a silane coupling agent and a silica having a BET specific surface area of $210 \, m^2/g$ or more;
   adding a vulcanization accelerator to a first kneaded material comprising the rubber component, the silane coupling agent and the silica;
   kneading a first resulting mixture comprising the rubber component, the silane coupling agent, the silica and the vulcanization accelerator such that a second kneaded material comprising the rubber component, the silane coupling agent, the silica and the vulcanization accelerator is obtained;
   adding a vulcanization agent to the second kneaded material comprising the rubber component, the silane coupling agent, the silica and the vulcanization accelerator; and
   kneading a second resulting mixture comprising the rubber component, the silane coupling agent, the silica, the vulcanization accelerator and the vulcanization agent,
   wherein the first kneaded material comprising the rubber component, the silane coupling agent and the silica has a pH of 6.5 or less, and the second kneaded material comprising the rubber component, the silane coupling agent, the silica and the vulcanization accelerator has a pH of 8.0 or more.

2. The method of claim 1, wherein the rubber component comprises a high cis butadiene rubber having a cis content of 70 mass % or more and a weight-average molecular weight of 300,000 or more such that a content of the high cis butadiene rubber exceeds 20 mass % with respect to 100 mass % of the rubber component.

3. The method of claim 2, wherein the high cis butadiene rubber is a modified high cis butadiene rubber having a functional group that reacts with the silica.

4. The method of claim 1, wherein the second kneaded material has a non-reaction rate of the silane coupling agent that is less than 20%.

5. The method of claim 2, wherein the second kneaded material has a non-reaction rate of the silane coupling agent that is less than 20%.

6. The method of claim 3, wherein the second kneaded material has a non-reaction rate of the silane coupling agent that is less than 20%.

7. The method of claim 1, wherein the silica has the BET specific surface area in a range of $210 \, m^2/g$ to $400 \, m^2/g$, the first kneaded material comprising the rubber component, the silane coupling agent and the silica has a pH in a range of 2.0 to 6.5, and the second kneaded material comprising the rubber component, the silane coupling agent, the silica and the vulcanization accelerator has a pH in a range of 8.0 to 13.

8. The method of claim 7, wherein the rubber component comprises the high cis butadiene rubber having the cis content in a range of 70 mass % to or more and a weight-average molecular weight of 300,000 or more such that the content of the high cis butadiene rubber is in a range of 20 mass % to 80 mass % with respect to 100 mass % of the rubber component.

9. The method of claim 8, wherein the high cis butadiene rubber is a modified high cis butadiene rubber having a functional group that reacts with the silica.

10. The method of claim 7, wherein the second kneaded material has a non-reaction rate of the silane coupling agent that is less than 20%.

11. The method of claim 1, wherein the silica has the BET specific surface area in a range of $210 \, m^2/g$ to $400 \, m^2/g$, the first kneaded material comprising the rubber component, the silane coupling agent and the silica has a pH in a range of 2.5 to 6.0, and the second kneaded material comprising the rubber component, the silane coupling agent, the silica and the vulcanization accelerator has a pH in a range of 8.5 to 13.

12. The method of claim 1, wherein the silica has the BET specific surface area in a range of $210 \, m^2/g$ to $400 \, m^2/g$, the first kneaded material comprising the rubber component, the silane coupling agent and the silica has a pH in a range of 3.0 to 5.5, and the second kneaded material comprising the rubber component, the silane coupling agent, the silica and the vulcanization accelerator has a pH in a range of 8.5 to 13.

13. The method of claim 1, wherein the silica has the BET specific surface area in a range of $210 \, m^2/g$ to $400 \, m^2/g$, the first kneaded material comprising the rubber component, the silane coupling agent and the silica has a pH in a range of 3.5 to 5.0, and the second kneaded material comprising the rubber component, the silane coupling agent, the silica and the vulcanization accelerator has a pH in a range of 8.5 to 13.

14. The method of claim 1, wherein the rubber component comprises a styrene butadiene rubber and a high cis butadiene rubber having a cis content of 70 mass % or more and a weight-average molecular weight of 300,000 or more such that a content of the high cis butadiene rubber exceeds 20 mass % with respect to 100 mass % of the rubber component, the silica has a content in a range of 10 parts by mass to 300 parts by mass with respect to 100 parts by mass of the rubber component, the silane coupling agent has a content in a range of 1 parts by mass to 10 parts by mass with respect to 100 parts by mass of the silica, the vulcanization accelerator has a content in a range of 0.5 parts by mass to 10 parts by mass with respect to 100 parts by mass of the rubber component, and the vulcanization agent has a content in a range of 0.1 parts by mass to 8 parts by mass with respect to 100 parts by mass of the rubber component.

15. A tire rubber composition obtained by a process comprising: kneading a rubber component, a silane coupling agent and a silica having a BET specific surface area of 210 m$^2$/g or more; adding a vulcanization accelerator to a first kneaded material comprising the rubber component, the silane coupling agent and the silica; kneading a first resulting mixture comprising the rubber component, the silane coupling agent, the silica and the vulcanization accelerator such that a second kneaded material comprising the rubber component, the silane coupling agent, the silica and the vulcanization accelerator is obtained; adding a vulcanization agent to the second kneaded material comprising the rubber component, the silane coupling agent, the silica and the vulcanization accelerator; and kneading a second resulting mixture comprising the rubber component, the silane coupling agent, the silica, the vulcanization accelerator and the vulcanization agent, wherein the first kneaded material comprising the rubber component, the silane coupling agent and the silica has a pH of 6.5 or less, and the second kneaded material comprising the rubber component, the silane coupling agent, the silica and the vulcanization accelerator has a pH of 8.0 or more.

16. The tire rubber composition of claim 15, wherein the rubber component comprises a high cis butadiene rubber having a cis content of 70 mass % or more and a weight-average molecular weight of 300,000 or more such that a content of the high cis butadiene rubber exceeds 20 mass % with respect to 100 mass % of the rubber component.

17. The tire rubber composition of claim 16, wherein the high cis butadiene rubber is a modified high cis butadiene rubber having a functional group that reacts with the silica.

18. The tire rubber composition of claim 15, wherein the second kneaded material has a non-reaction rate of the silane coupling agent that is less than 20%.

19. The tire rubber composition of claim 16, wherein the second kneaded material has a non-reaction rate of the silane coupling agent that is less than 20%.

20. The tire rubber composition of claim 17, wherein the second kneaded material has a non-reaction rate of the silane coupling agent that is less than 20%.

* * * * *